(12) United States Patent
Eickhoff et al.

(10) Patent No.: US 7,976,971 B2
(45) Date of Patent: Jul. 12, 2011

(54) POWER GENERATOR WITH A PNEUMATIC SLIDE VALVE

(75) Inventors: Steven Eickhoff, Plymouth, MN (US); Robert B. Ellman, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 1462 days.

(21) Appl. No.: 11/382,905

(22) Filed: May 11, 2006

(65) Prior Publication Data

US 2007/0264549 A1    Nov. 15, 2007

(51) Int. Cl.
*H01M 8/04*    (2006.01)
*H01M 8/06*    (2006.01)

(52) U.S. Cl. .......... 429/34; 429/408; 429/416; 429/421; 429/427

(58) Field of Classification Search .................. None
See application file for complete search history.

(56) References Cited

U.S. PATENT DOCUMENTS

| | | |
|---|---|---|
| 3,133,837 A | 5/1964 | Eidensohn |
| 4,048,385 A | 9/1977 | Regnaut |
| 4,476,196 A | 10/1984 | Poeppel et al. |
| 4,476,197 A | 10/1984 | Herceg |
| 4,596,748 A | 6/1986 | Katz et al. |
| 4,659,559 A | 4/1987 | Struthers |
| 4,826,741 A | 5/1989 | Aldhart et al. |
| 4,857,420 A | 8/1989 | Maricle et al. |
| 4,876,163 A | 10/1989 | Reichner |
| 4,910,100 A | 3/1990 | Nakanishi et al. |
| 5,298,341 A * | 3/1994 | Khandkar et al. ........... 429/32 |
| 5,372,617 A | 12/1994 | Kerrebrock et al. |
| 5,449,697 A | 9/1995 | Noaki et al. |
| 5,804,329 A | 9/1998 | Amendola |
| 5,836,750 A | 11/1998 | Cabuz |
| 5,851,689 A | 12/1998 | Chen |
| 5,861,221 A | 1/1999 | Ledjeff et al. |

(Continued)

FOREIGN PATENT DOCUMENTS

DE   19734259   2/1999

(Continued)

OTHER PUBLICATIONS

Aiello et al., "Production of Hydrogen from Cheical Hydrides Via Hydrolysis with Steam," International Journal of Hydrogen Energy, vol. 24, pp. 1123-1130, 1999.

(Continued)

*Primary Examiner* — Ula C. Ruddock
*Assistant Examiner* — Alix Echelmeyer
(74) *Attorney, Agent, or Firm* — Seager, Tufte & Wickhem LLC

(57) ABSTRACT

A power generator having a fuel cell and a fuel container in an enclosure with a pneumatic slide valve interposed between the fuel cell and the fuel container. The fuel cell may provide water vapor which goes to react with the fuel of the container and result in a production of hydrogen for the fuel cell. The valve may be connected to a pressure sensitive membrane that is linked to the valve such that when the pressure within the enclosure increases, the membrane will begin to move and close the valve to cut off the supply of water vapor to the fuel to reduce hydrogen production and consequently the pressure. With a reduction or stoppage of hydrogen production, the pressure may decrease and the membrane may begin to open the valve to let in water vapor to the fuel to make more hydrogen.

20 Claims, 9 Drawing Sheets

U.S. PATENT DOCUMENTS

| | | | |
|---|---|---|---|
| 6,093,501 | A | 7/2000 | Werth |
| 6,250,078 | B1 | 6/2001 | Amendola et al. |
| 6,280,869 | B1 | 8/2001 | Chen |
| 6,326,097 | B1 | 12/2001 | Hockaday |
| 6,541,149 | B1 | 4/2003 | Maynard et al. |
| 6,620,542 | B2 | 9/2003 | Pan |
| 7,001,681 | B2 | 2/2006 | Wood |
| 2001/0028973 | A1 | 10/2001 | Ong et al. |
| 2002/0068213 | A1 | 6/2002 | Kaiser et al. |
| 2002/0177031 | A1 | 11/2002 | Doshi et al. |
| 2003/0054215 | A1 | 3/2003 | Doshi et al. |
| 2004/0161646 | A1 | 8/2004 | Rezachek et al. |
| 2004/0209133 | A1* | 10/2004 | Hirsch et al. .............. 429/22 |
| 2004/0229094 | A1 | 11/2004 | Bae et al. |
| 2005/0136300 | A1* | 6/2005 | Dyer ......................... 429/19 |
| 2005/0142410 | A1 | 6/2005 | Higashi et al. |
| 2005/0181245 | A1 | 8/2005 | Bonne et al. |
| 2005/0260461 | A1 | 11/2005 | Wood et al. |
| 2006/0014059 | A1 | 1/2006 | Wood |
| 2006/0040152 | A1 | 2/2006 | Wood |
| 2006/0059778 | A1* | 3/2006 | Shurtleff et al. ............. 48/61 |
| 2006/0073371 | A1* | 4/2006 | Drake et al. ................ 429/34 |

FOREIGN PATENT DOCUMENTS

| | | |
|---|---|---|
| EP | 1351329 | 10/2003 |
| EP | 1496561 | 1/2005 |
| GB | 723180 | 2/1955 |
| JP | 57138782 | 8/1982 |
| JP | 60000066 | 1/1985 |
| JP | 4342439 | 5/1991 |
| JP | 9326259 | 12/1997 |
| JP | 2004206998 | 7/2004 |
| WO | 0035032 | 6/2000 |
| WO | 0045457 | 8/2000 |
| WO | 2004025750 | 3/2004 |
| WO | 2006113469 | 10/2006 |
| WO | 2007008893 | 1/2007 |

OTHER PUBLICATIONS

Amendola et al., "A Safe Portable Hydrogen Gas Generator Using Aqueous Borohyfride Solution and Ru Catalyst," International Journal of Hydrogen Energy, Vo., 25, No. 10, pp. 969-975, 2000.

Amendola et al., "A Novel High Power Density Borohydride-Air Cell," Electromechanical Society Proceedings, vol. 98-15, pp. 47-54, Nov. 1, 1998.

Amendola et al., An Ultrasafe Hydrogen Generator: Aqueous, Alkaline Borohydride Solutions and Ru Calalyst, Journal of Power Sources, vol. 85, No. 2, pp. 186-189, 2000.

* cited by examiner

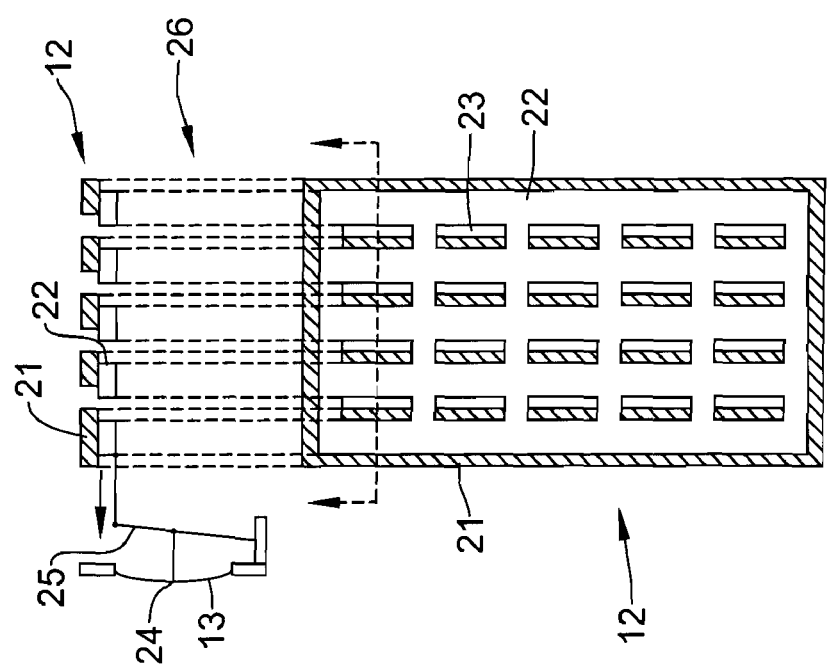

POWER GENERATOR WITH A PNEUMATIC SLIDE VALVE

The present invention may be related to U.S. patent application Ser. No. 11/247,435, filed Oct. 11, 2005; U.S. patent application Ser. No. 09/941,247, filed Aug. 28, 2001; U.S. patent application Ser. No. 10/780,827, filed Feb. 18, 2004; U.S. patent application Ser. No. 10/891,380, filed Jul. 14, 2004; U.S. patent application Ser. No. 10/850,673, filed May 21, 2004; U.S. patent application Ser. No. 10/750,581, filed Dec. 29, 2003; U.S. patent application Ser. No. 11/209,591, filed Aug. 22, 2005; U.S. patent application Ser. No. 11/270,848, filed Nov. 9, 2005; U.S. patent application Ser. No. 11/257,872, filed Oct. 25, 2005; and U.S. patent application Ser. No. 11/257,738, filed Oct. 25, 2005; all of which are hereby incorporated by reference.

BACKGROUND

The present invention pertains to power generation devices and particularly to election power generation devices. More particularly, the invention pertains to fuel cells.

SUMMARY

The invention is a space efficient energy per unit volume fuel cell having a pneumatic slide valve.

BRIEF DESCRIPTION OF THE DRAWING

FIGS. 2a, 2b and 2c show three positions of a grid-like valve used in the fuel cell;

DESCRIPTION

Figure 1:
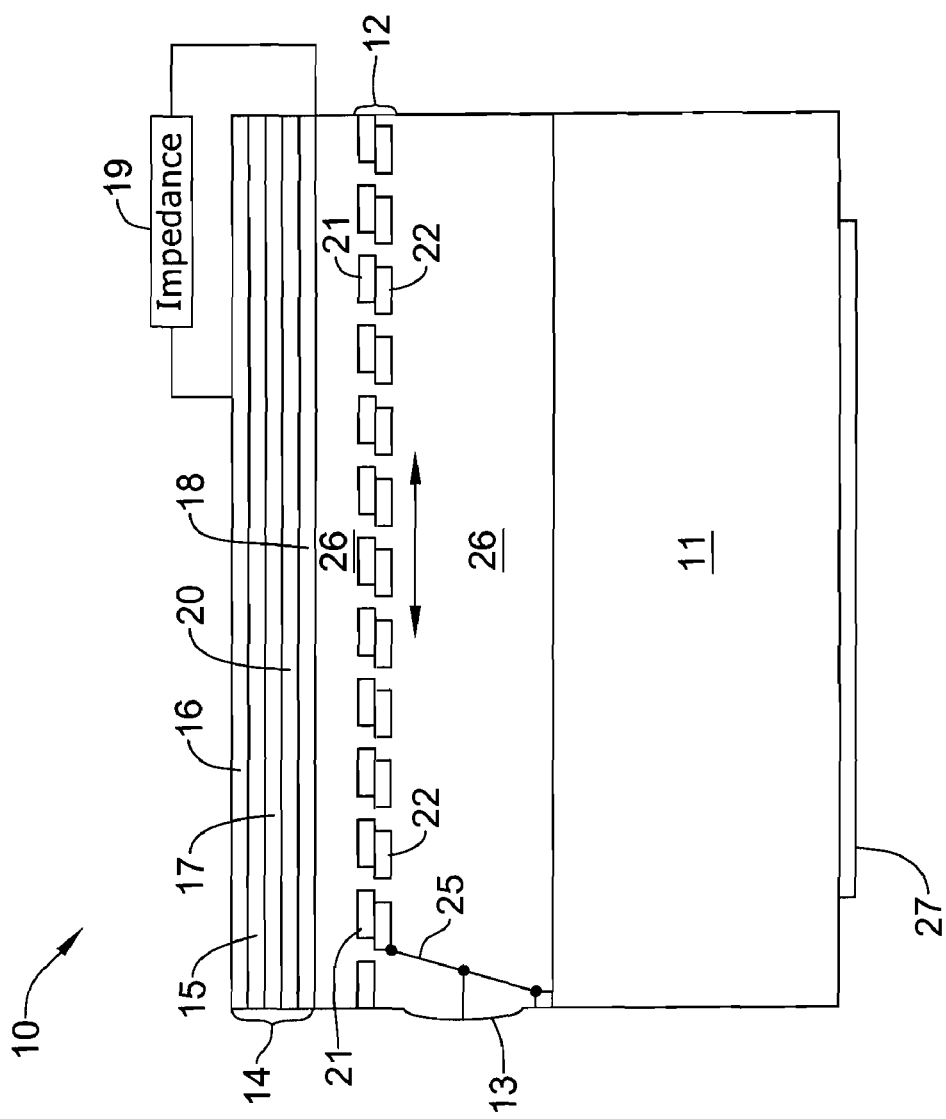
FIG. 1 is a sectional side view of a fuel cell.

FIG. 1 shows a fuel cell power generator or generation system or assembly 10 having a fuel container 11, a mesh, perforated plate or layer, or grid, or the like, type of valve 12 connected to a pressure sensitive diaphragm 13, and having a number of elements for a fuel cell 14 which are designed to provide electrical power. The elements may include a cathode electrode 16, a cathode gas diffusion layer 15, a membrane 17, an anode gas diffusion layer 20, and an anode electrode 18. In the present example, the fuel cell may be on one side (or at the top in the Figure) of the block-like configuration 10 in FIG. 1. In the lower portion of the fuel cell assembly 10 may be a fuel container 11 which may contain a quantity of lithium alumina hydride or other cell fuel. A partial pressure may cause oxygen of the atmosphere to be drawn into a cavity 26. There is not a partial pressure for nitrogen of the atmosphere. The atmosphere may be dry and draw in some of the water. The oxygen may come in on the cathode 16 side of the plurality of elements or cell 14. Protons may move from the anode 18 to the cathode 16. There may be a water vapor which has a partial pressure but the vapor is kept in by a membrane. Electrons may be stripped from the $H_2$ to result in protons going from the anode electrode 18 through an anode gas diffusion layer 20, a membrane 17 and a cathode diffusion layer 15 to the cathode 16. The electrons may constitute an electrical current that flows from the anode 18 through an impedance load 19 and to the cathode 16 where the electrons, protons and oxygen form a water vapor. Layer 17 may be a water vapor permeable electrolytic membrane. On the cathode may be an oxygen permeable, water vapor impermeable membrane. There may various approaches to the design of the fuel cell 14.

The valve 12 may be in place to regulate the water from going down, but not to keep the $H_2$ from going up, relative to the orientation of assembly 10 in FIG. 1. Water may be a generated product at the cathode. There may be a gas impermeable layer at the number of elements or cell 14 to prevent water or vapor from going through while permitting protons to move through the cell. When the water vapor encounters the fuel from the container 11, hydrogen may be produced. The reaction may be stated as follows:

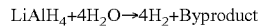

$$LiAlH_4 + 4H_2O \rightarrow 4H_2 + Byproduct$$

Figure 2A:
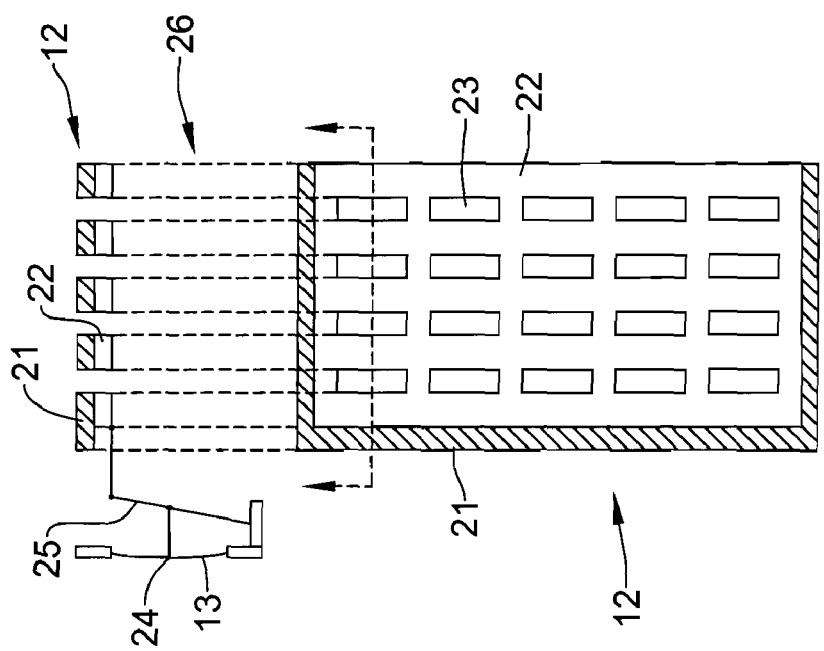
Figure 2C:
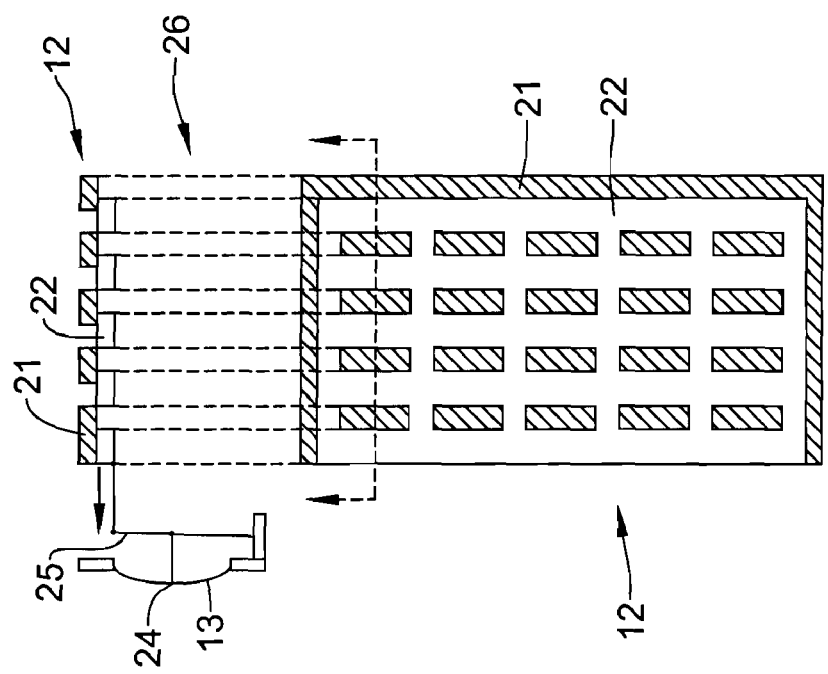

FIGS. 2a, 2b and 2c illustrate an operation of the valve in the present fuel cell design. The valve in FIG. 2a may be open. A diaphragm 13 may move the valve 12 to an open position and, on the other hand, move the valve 12 to a closed position as shown in FIG. 2c. The valve may have a partially open position as identified in FIG. 2b. Valve 12 may have two mesh-, grid- or plate-like parts 21 and 22. These parts may be of other forms or design to effect the operation described here. Part 21 may be stationary relative to the fuel cell assembly or system 10. Part 22 may be positioned on or adjacent to part 21. These parts 21 and 22 may be plates or the like with numerous openings 23 in them. The openings may be in the form of, for instance, small rectangular shapes laid out in a symmetrical pattern in both plates 21 and 22. With plate 22 overlaid on plate 21, the openings 23 may be aligned such that matter may flow through the pair of plates 21 and 22, as shown in FIG. 2a. Plate 22 may be moved left relative to plate 21 and the openings 23 will become partially closed as shown in FIG. 2b. If plate 22 is further moved left, the openings 23 may be closed in that portions of plates 21 and 22 overlap each other's openings, as shown in FIG. 2c.

Even though the valve 12 is described in terms of two plates or the like, more than two plates or the like may be implemented in valve 12. The principle of operation may be the same except there may be various partial overlaps of the more than two plates for perhaps more precise control of a flow through the valve 12. A valve having more than two plates or the like may be applicable to the configuration or assembly 30 of FIG. 3 or to other kinds of configurations or assemblies.

Plate 22 may be moved by a diaphragm 13 which is pressure sensitive. If pressure of matter in the portion of the cell assembly in the volume 26 proximate to plate 22 increases, as shown in FIGS. 2a, 2b and 2c, then the diaphragm 13 may bulge out from the chamber volume 26 proximate to plate 22. Attached at about a center 24 of diaphragm 13 may be a linkage 25 that is attached to plate 22. When bulging out at the center 24 (to the left in the Figures) because of pressure, then the linkage 25 may likewise pull plate 22 to the left (in the Figures) to reduce the flow of matter or gas through the plates in response to the increased pressure. If the pressure increases even more, then diaphragm 13 may expand further out to its stop thereby causing plate 22 to have its non-open areas overlap plate 21 openings 23, and plate 21 to have its non-open areas overlap plate 22 openings and effectively stop the flow of matter (e.g., water vapor) through plates 21 and 22. As the pressure decreases in the chamber 26 proximate to plate 22, then diaphragm 13 may begin returning to a less bulged state and via the linkage 25 push plate 22 so that a part of the openings 23 of both plates 21 and 22 are uncovered or unclosed. Further reduction of the pressure in chamber 26 may result in diaphragm 13 returning to its initial open position thereby moving plate 22 so that the openings 23 of plates 21 and 22 are aligned such that none of the openings 23 in the plates are effectively obscured by either plate. Again, as the chamber 26 pressure increases, the valve 12 begins to close, and as the chamber 26 pressure decreases, the valve 12 begins to open. Thus, the amount of flow through the valve 12 may be determined by the chamber 26 pressure. This approach may provide a regulation of the flow or volume of the gas from chamber 26 through the valve. This operation may be implemented with a valve 12 having more than two plates or components for controlling a flow of a fluid or material. A fluid may be a gas or a liquid.

Figure 3:
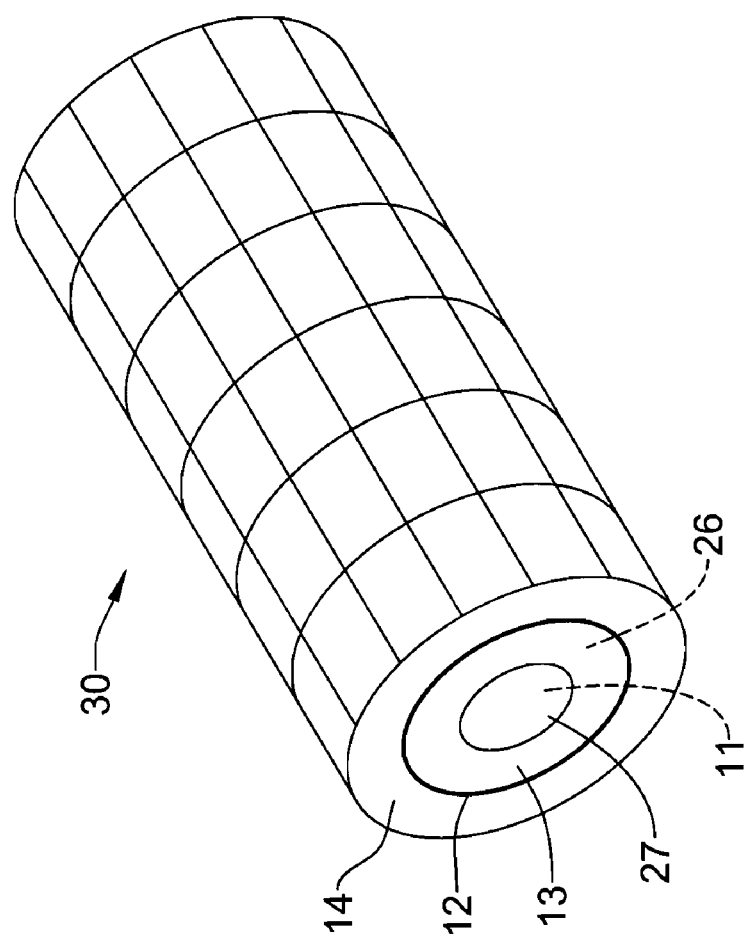
FIG. 3 shows a cylindrical shaped fuel cell utilizing the valve of FIGS. 2a, 2b and 2c.

The valve mechanism described in FIGS. 2a, 2b and 2c may be designed into a cylindrical fuel cell device 30 as shown in FIG. 3. The mechanism may also be designed into a fuel cell generator assembly having some other shape. In FIG. 3, the fuel volume or supply may be in the center of the cylinder. Between the cell 14 and the fuel supply container or chamber 11 may be a cylindrical slide valve 12. The valve may be two cylindrical sleeves of grid, mesh, perforated material, or the like, that are concentric and adjacent to each other. The parts 21 and 22 of the cylindrical valve may slide relative to each other to open and close the valve 12 (like the parts 21 and 22 in FIGS. 2a-2c). On the outside of the circumference slide valve 12 may be a fuel cell or cells 14 (similar to the fuel cell 14 of FIG. 1).

A diaphragm 13 for operating the cylindrical valve 12 may be situated at the end of a cylindrical chamber 26 and linked to a part 21 or 22 of valve 12. Diaphragm 13 may be responsive to pressure in chamber 26 in that if the pressure increases, one of the valve 12 parts 21 and 22 will be moved relative to the other by the linked diaphragm 13 to close the valve 12, and if the pressure decreases, then the valve 12 will be at least gradually opened, thereby monitoring an amount of vapor flow to the fuel cell or cells 14. The same design and operation of the present illustrative examples of fuel cell assemblies 10 and 30 may apply to fuel cell assemblies of other shapes.

The chamber 26 of the fuel cell assembly 10, 30 may be sealed and fuel may added through an opening having a removable cover 27 adjacent or part of the fuel chamber 11, which seals chamber 26 when the cover is in place.

The fuel cell 14 may have an electrolytic membrane 17 positioned between a negative electrode or cathode 16 and a positive electrode or anode 18. A hydrogen fuel (i.e., hydrogen gas) may be channeled through flow field plates 21 and 22 to the anode 18, while oxygen is channeled to the cathode 16 of the fuel cell. At the anode 18, the hydrogen may be split into positive hydrogen ions (protons) and negative electrons. The electrolytic membrane may allow only protons to pass through it to the cathode 16. The electrons instead may travel as a current via an external circuit 19 to the cathode 16. At the cathode 16, the electrons and the protons may combine with oxygen to form water molecules.

Once water is formed as a byproduct of an oxygen-hydrogen reaction at the fuel cell 14, the produced water may passively diffuse back through the fuel cell into a cavity 26 to the fuel chamber or container 11. Within the cavity 26 on the anode 18 side of the fuel cell 14, a relatively low humidity region may exist due to a moisture absorbing nature of the fuel substance in fuel container 11. Thus, the water retention at the cathode 16 may generate a moisture concentration gradient and a gas pressure differential which causes water molecules to diffuse back through the fuel cell 14 into cavity 26 and to fuel chamber 12 in the form of water vapor. This water vapor may react with the fuel of container 11 and generate hydrogen gas. The generated hydrogen gas may then pass through cavity 26 and to the fuel cell anode 18 where it can react with oxygen to once again generate water molecules. This cycle may continue until all of the fuel in chamber 11 is consumed.

The fuel cell power generator system 10, 30 may utilize the valve 12 for regulating the passage of water vapor from the fuel cell 14 to the container 11 and regulating the production of hydrogen gas from the fuel container 11. Valve 12 may be positioned in the cavity 26 between the fuel container 11 and the fuel cell 14. Valve 12 may be a pneumatic valve that is controlled by a gas pressure in the cavity 26, where it is pneumatically adjusted to control a conveyance of water vapor to the fuel container 11. Valve 12 may be a slidable plate 22 with openings adjacent to another plate 21 having similar openings 23 which overlap each other upon closing or opening the valve 12, which is described at another place of this description. When the valve 12 is in a closed position, it may prevent water vapor from reaching the fuel container 11. Alternatively, when valve 12 is in an open position, it may allow water vapor to reach the fuel container 11 and allow generated hydrogen gas to reach the fuel cell 14. The singular reference to a fuel cell 14 in this description may also mean reference to more than one fuel cell.

The actuation of valve 12 may be controlled by an internal pressure exerted on the diaphragm 13. As the internal gas pressure of the cavity 26 rises due to the generation of hydrogen gas, the diaphragm 13 may bend or push out slightly. This may cause the linkage 25 to pull slidable valve plate 22 and move it relative to plate 21, closing the valve 12 and preventing the flow of additional water vapor to the fuel container 11. With valve 12 closed, the hydrogen production may cease. This situation may also prevent the internal gas pressure from rising further. As hydrogen is consumed, such as by fuel cell 14, the internal gas pressure may drop, allowing the membrane 13 to return to a more relaxed state and open the valve 12. The sliding valve 12 plate 22 may move about one millimeter from fully open to fully closed. It may take about 4 psi (27 kPa) to 6 psi (42 kPa) pressure on the membrane or diaphragm 13 to fully close the valve 12. Accordingly, hydrogen gas may automatically be produced at a rate at which it is consumed.

Figure 4A:
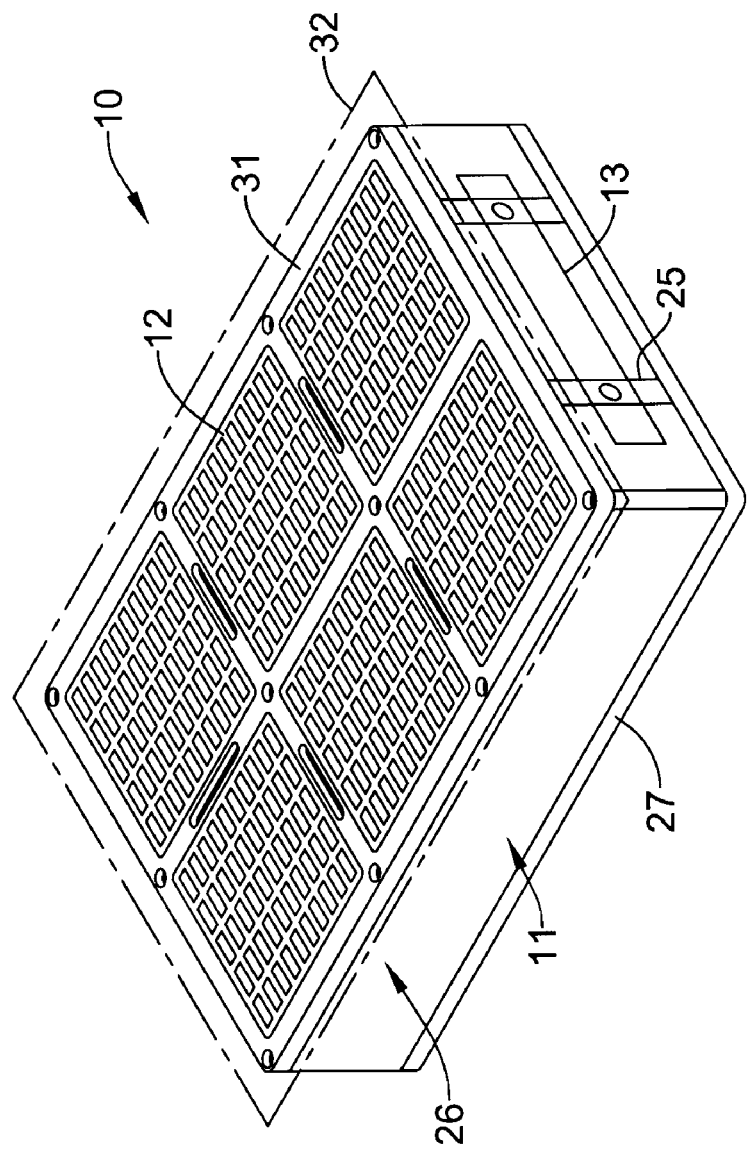
FIGS. 4a and 4b show an illustrative implementation of a body structure of the fuel cell power generator assembly.
Figure 4B:
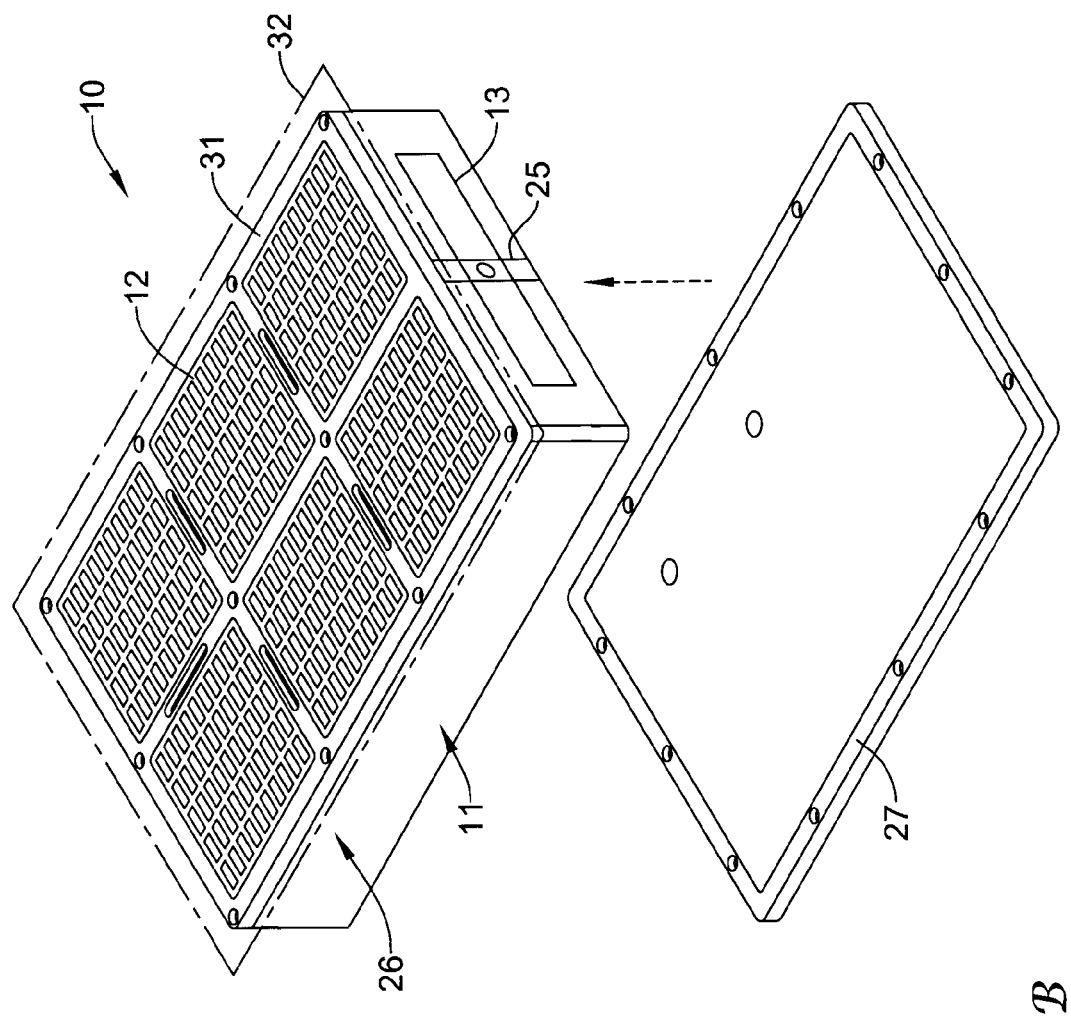

FIGS. 4a and 4b show an illustrative implementation of a body structure for the fuel cell system or assembly 10. Adjacent to the valve 12 may be a window frame like structure 31. Structure 31 may provide strength to the valve and the assembly. Valve 12 may have two or more grids where one or more grids are moveable relative to the other grid or grids for opening and closing the valve. The moveable grids may be connected to the pressure sensitive diaphragm 13. Adjacent to the valve 12 may be the chamber or cavity 26. The fuel container or chamber 11 may be adjacent to cavity or chamber 26. At the exterior portion of the fuel container or chamber 11 may be a cover 27. Cover 27 may seal the container or chamber 11 from the ambient environment. Cover 27 may be removed, as shown in FIG. 4b, for adding fuel to the container or chamber 11. Situated at a level 32 proximate to structure 31 and valve 12, fuel cell 14 components may be placed.

Figure 5A:
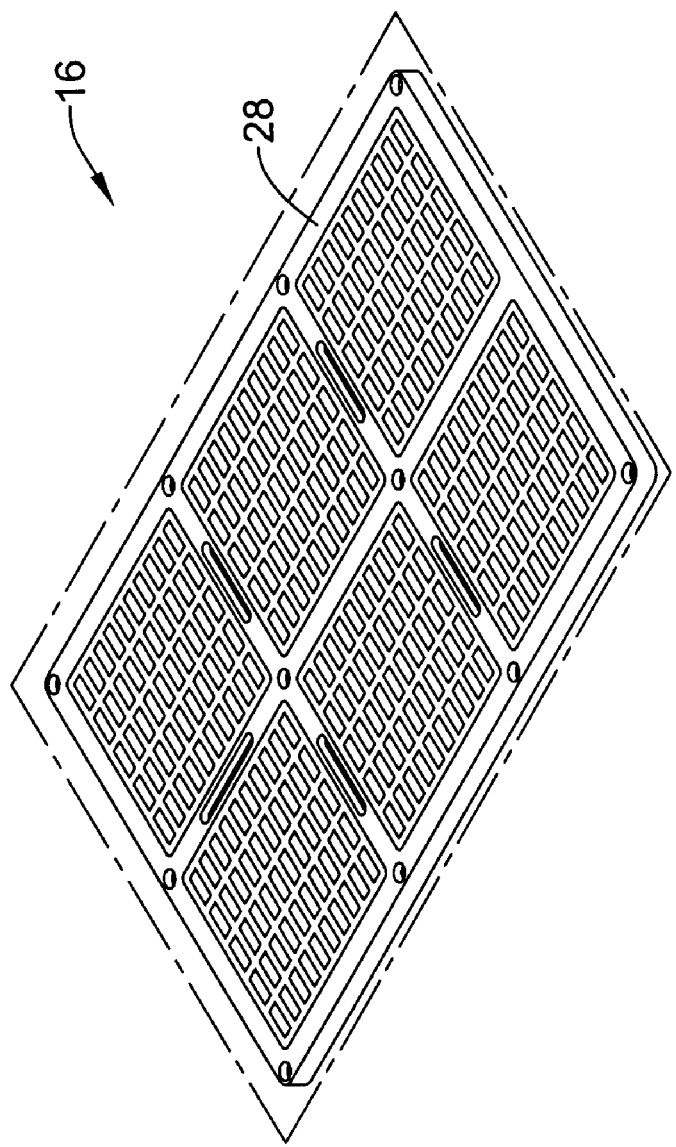
FIGS. 5a and 5b show a top portion for the illustrative of the body structure in FIGS. 4a and 4b.
Figure 5B:
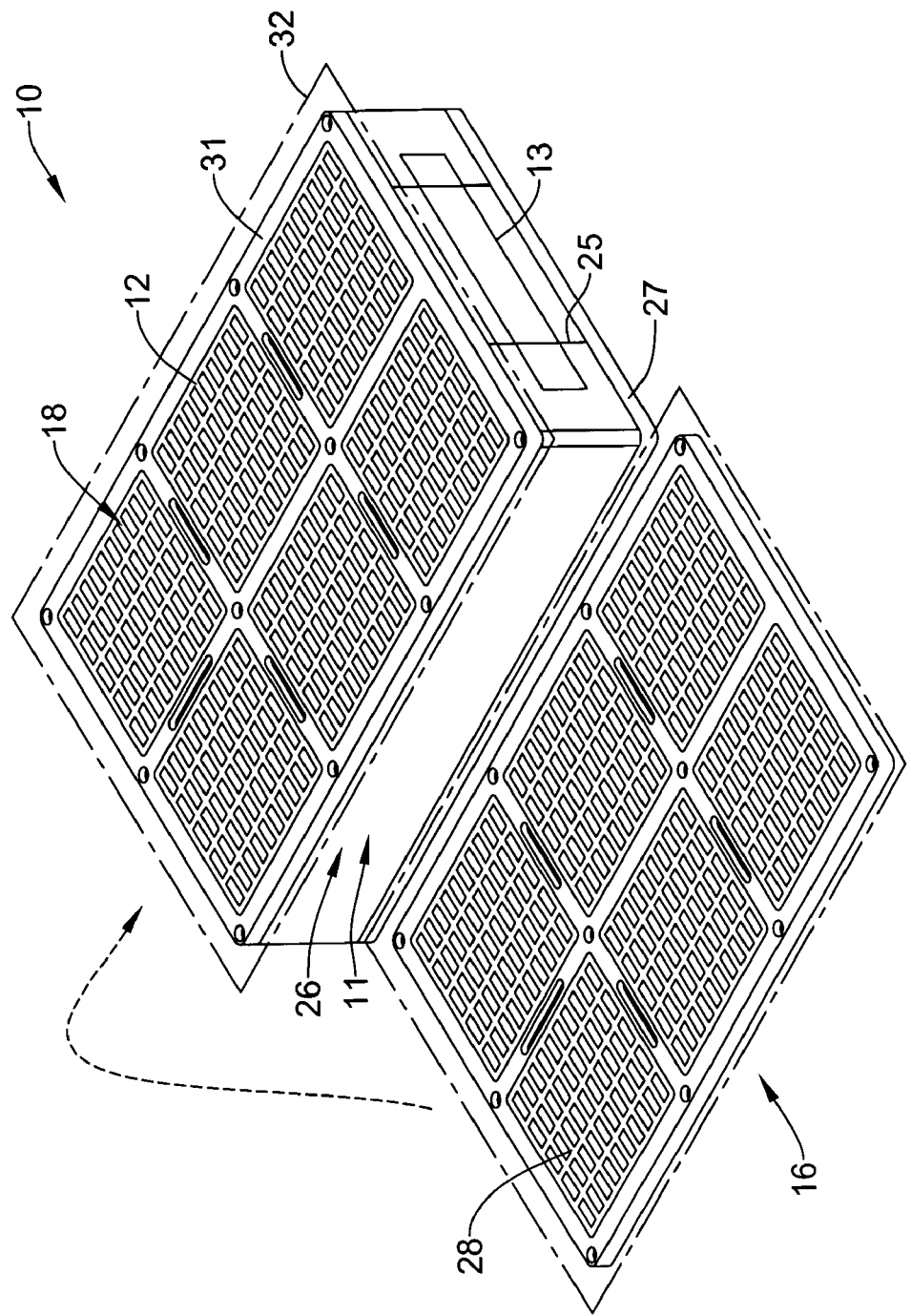

Electrode 18 may be a gold coating on top of the stationary portion or plate 21 of valve 12. Electrode 16 may be a coating on the bottom side of a top structure 28 that may be placed on the assembly 10, as shown in FIGS. 5a and 5b. Structure 28 may have grid or mesh openings that are aligned with those of plate 21. Layers or components 15, 17 and 20 may be situated between electrodes 16 and 18. Other components or layers may be situated between, or on top or bottom of the electrodes 16 and 18, respectively.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A power generator comprising:
   a housing;
   a fuel cell situated in the housing, wherein the fuel cell generates a water vapor;
   a fuel chamber situated in the housing, wherein the fuel chamber contains a fuel that generates hydrogen upon receipt of the water vapor;
   a valve situated in the housing between the fuel cell and the fuel chamber; and
   a pressure sensitive mechanism linked to the valve; and
   wherein:
   the valve may be closed to effectively provide a barrier between the fuel cell and the fuel chamber, or the valve may be opened; and
   the pressure sensitive mechanism closes or opens the valve according to a pressure within the housing proximate to the fuel chamber; and
   wherein when the valve is closed virtually all water vapor is prevented from passing from the fuel cell to the fuel chamber and hydrogen is not prevented from passing through the valve from the fuel chamber to the fuel cell.

2. The generator of claim 1, wherein the valve comprises:
   a first mesh; and
   a second mesh adjacent to the first mesh; and
   wherein:
   a first position of the second mesh relative to the first mesh is a closed valve; and
   a second position of the second mesh relative to the first mesh is an open valve.

3. The generator of claim 2, wherein:
   if the pressure within the housing increases, the pressure sensitive mechanism slides the second mesh towards a first position; and
   if the pressure within the housing decreases, the pressure sensitive mechanism slides the second mesh towards a second position.

4. The generator of claim 1, wherein the valve is a pneumatic slide valve controlled by pressure within the housing.

5. The generator of claim 3, wherein the fuel cell comprises:
   a cathode;
   an anode; and
   a water vapor permeable membrane situated between the cathode and the anode; and
   wherein the valve is for controlling water vapor from the fuel cell to the fuel chamber.

6. The generator of claim 5, wherein the pressure sensitive mechanism comprises:
   a fluid impervious membrane covering an opening situated between an interior of the housing and an exterior of the housing; and
   a linkage connecting the membrane to the second mesh.

7. The generator of claim 6, wherein:
   as the fuel generates hydrogen gas, a pressure within the housing increases resulting in the membrane moving to close via the linkage the valve and to reduce or stop water vapor from the fuel cell going to the fuel of the fuel chamber, and to reduce an amount of hydrogen being generated so as to slow, stop or reverse the increase of pressure within the housing.

8. The generator of claim 4, wherein:
   the fuel cell is situated on a first side of the housing; and
   the fuel chamber is situated on a second side of the housing.

9. The generator of claim 4, wherein:
   the housing is cylindrical;
   the fuel cell is situated proximate to an outer wall of the housing;
   the fuel chamber is situated at about a center of the housing; and
   the valve is cylindrical and approximately concentrically situated between the fuel chamber and the fuel cell.

10. The generator of claim 9, wherein the pressure sensitive mechanism is proximate to an end of the housing.

11. A method for providing a power generator comprising:
    situating a fuel cell in a housing;
    situating a fuel chamber in the housing proximate to the fuel cell; and
    placing a valve between the fuel cell and the fuel chamber; and
    wherein:
    the valve comprises two or more layers;
    each layer has a plurality of openings;
    the two or more layers are adjacent to each other; and
    one or more layers are moveable relative to one or more other layers to open or close the valve; and
    wherein when the valve is closed virtually all water vapor is prevented from passing from the fuel cell to the fuel chamber and hydrogen is not prevented from passing through the valve from the fuel chamber to the fuel cell.

12. The method of claim 11, wherein:
    when the one or more layers are in a first position relative to the one or more other layers, some openings of the plurality of openings of the one or more layers are aligned with some openings of the plurality of openings of the one or more other layers;
    when the one or more layers are in a second position relative to the one or more other layers, nearly no openings of the plurality of openings of the one or more layers are aligned with the openings of the plurality of openings of the one or more other layers.

13. The method of claim 12, further comprising moving the one or more layers relative to the one or more other layers from the first position to the second position and vice versa according to a pressure proximate to the fuel chamber.

14. The method of claim 13, further comprising:
    detecting the pressure with a membrane situated between a volume proximate to the fuel chamber and a volume external to the housing; and
    linking the membrane to the one or more layers layer for adjusting the valve according to the pressure detected.

15. A power generating system comprising:
    an enclosure;
    a fuel cell situated in the enclosure;
    a fuel chamber situated in the enclosure;
    a valve situated in the enclosure between the fuel cell and the fuel chamber; and
    a pressure sensor situated proximate to the fuel chamber and connected to the valve;

wherein:

the fuel cell generates a water vapor;

the fuel chamber contains a fuel that generates hydrogen upon receipt of the water vapor;

as the fuel generates hydrogen, the pressure increases which is sensed by the pressure sensor which in turn closes the valve to reduce or stop the water vapor from going to the fuel at the fuel chamber and thus reduce a generation of hydrogen to slow, stop or . . . reverse a change of the pressure;

and wherein when the valve is closed virtually all water vapor is prevented from passing from the fuel cell to the fuel chamber and hydrogen is not prevented from passing through the valve from the fuel chamber to the fuel cell.

16. The system of claim 15, wherein the valve comprises:

a first grid having openings;

a second grid having openings situated adjacent to the first grid;

wherein:

moving the first grid or the second grid relative to the other provides an opening and closure of the valve;

the pressure sensor is connected to the valve; and the valve is opened or closed according to a magnitude of pressure sensed by the pressure sensor.

17. The system of claim 16, wherein the first grid or the second grid slide relative the other grid to provide a variable opening and a closure of the valve.

18. The system of claim 16, wherein:

the fuel cell is situated at a first location of the enclosure; and the fuel chamber is situated at a second location of the enclosure.

19. The system of claim 16, wherein:

the enclosure is cylindrical;

the fuel cell is situated on an outer side of the enclosure;

the fuel chamber is situated at an approximate center of the enclosure;

the first and second grids are approximately cylindrical and concentrically situated between the fuel chamber and the fuel cell; and the pressure sensor is situated at an end of the enclosure.

20. The system of claim 15, wherein:

the valve has two or more grids adjacent among themselves;

the two or more grids have pluralities of openings that overlap in a manner such that the valve may be open or closed according to a position of the two or more grids relative to one another;

the pressure sensor may move one or more of the two or more grids relative to one another to open or close the valve to maintain a certain pressure proximate to the fuel chamber.

* * * * *